(12) United States Patent
Tanaka et al.

(10) Patent No.: US 9,897,982 B2
(45) Date of Patent: Feb. 20, 2018

(54) PID CONTROLLER AND DATA COLLECTING METHOD

(71) Applicant: Azbil Corporation, Tokyo (JP)

(72) Inventors: Masato Tanaka, Tokyo (JP); Eisuke Toyoda, Tokyo (JP); Fumihiro Sugawara, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 360 days.

(21) Appl. No.: 14/754,807

(22) Filed: Jun. 30, 2015

(65) Prior Publication Data

US 2016/0004226 A1 Jan. 7, 2016

(30) Foreign Application Priority Data

Jul. 1, 2014 (JP) .................................. 2014-135560

(51) Int. Cl.
*G05B 11/42* (2006.01)
(52) U.S. Cl.
CPC .................................... *G05B 11/42* (2013.01)
(58) Field of Classification Search
None
See application file for complete search history.

(56) References Cited

U.S. PATENT DOCUMENTS

| | | | | |
|---|---|---|---|---|
| 4,630,189 A | * | 12/1986 | Ohmori | F01K 13/003 |
| | | | | 700/30 |
| 2005/0192681 A1 | * | 9/2005 | Matsunaga | G05B 5/01 |
| | | | | 700/29 |
| 2005/0228512 A1 | * | 10/2005 | Chen | G05B 13/021 |
| | | | | 700/42 |

FOREIGN PATENT DOCUMENTS

| | | |
|---|---|---|
| CN | 1293395 A | 5/2001 |
| CN | 201089781 Y | 7/2008 |
| CN | 101368778 A | 2/2009 |
| CN | 102654750 A | 9/2012 |
| CN | 102829590 A | 12/2012 |
| CN | 203327163 U | 12/2013 |
| JP | 2008-286603 A | 11/2008 |
| JP | 2009-217439 A | 9/2009 |
| KR | 10-2012-0139539 A | 12/2012 |
| TW | 200728693 A | 8/2006 |

OTHER PUBLICATIONS

Office Action dated Jul. 18, 2017 in Chinese Patent Application No. 201510374622.5 (with English translation of category of cited documents).

(Continued)

*Primary Examiner* — Ryan Jarrett

(74) *Attorney, Agent, or Firm* — Oblon, McClelland, Maier & Neustadt, L.L.P.

(57) ABSTRACT

A PID controller includes: a manipulated variable calculating portion that calculates a manipulated variable MV based on a set point SP and a process variable PV through a PID control calculation; a manipulated variable outputting portion that outputs a manipulated variable MV to outside of the controller; an alarm notifying portion that generates an alarm when a problem has been detected; a data recording portion that temporarily records time series data for the process variable PV; and a data storing portion that reads out and storing data recorded by the data recording portion 15 before and after the alarm event.

10 Claims, 4 Drawing Sheets

(56) References Cited

OTHER PUBLICATIONS

Office Action dated Feb. 3, 2017 in Chinese Patent Application No. 201510374622.5 (with English translation of category of cited documents).
Taiwanese Office Action dated Jan. 25, 2016, issued in corresponding Taiwanese Patent Application No. 14P00210US.

* cited by examiner

PID CONTROLLER AND DATA COLLECTING METHOD

CROSS REFERENCE TO RELATED APPLICATION

This application claims priority under 35 U.S.C. § 119 to Japanese Patent Application No. 2014-135560, filed on Jul. 1, 2014, the entire content of which being hereby incorporated herein by reference.

FIELD OF TECHNOLOGY

The present invention relates to a proportional-integral-derivative ("PID") controller, such as a temperature controller, and, in particular, relates to a PID controller that is provided with a data collecting function.

BACKGROUND

Temperature controllers that are equipped with PID controlling functions are used in order to control temperatures in heat treatment furnaces, and the like. In a temperature regulator, it is necessary to set a large number of parameters, such as PID parameters. The temperature regulator performs PID calculations using the PID parameters, to output a manipulated variable MV that will cause the measured temperature PV to go to the set point SP that is set to the target temperature. This makes it possible to cause the measured temperature PV (the process variable PV) to approach the target temperature (the set point SP). Consequently, setting of the PID parameters, and the like, is necessary and important.

However, the control result information (data for characteristic values in control response, such as the time to arrival at the set point, the amount of overshoot, and so forth) is useful information, as the result of control for the actual control target, when ascertaining states wherein there are problems in control, and when adjusting the PID parameters. Because of this, a function is executed wherein characteristic values for the control response within the temperature controller are calculated, and are stored within the temperature controller, as the series of control operations, such as heating and cooling, are performed. See, for example, Japanese Unexamined Patent Application Publication No. 2009-217439 (the "JP '439"). On the other hand, there are also devices, such as data loggers, that collect and record all measured data. See, for example, Japanese Unexamined Patent Application Publication No. 2008-286603 (the "JP '603"). The data collecting functions disclosed in the JP '439 and the JP '603 enable the characteristic values for the control response in PID control, or all time series data, to be collected, to be subject to monitoring, and to be processed as subject to analysis.

In the temperature control, if there is only a series of control operations, such as ramping the temperature up and down, this will be insufficient for efficient information collection. Moreover, because of the limitation in That is, in the feature quantity calculating function that is disclosed in the JP '439, there is a limit to the amount of information that can be stored, and thus it is insufficient. On the other hand, with the data logger disclosed in the JP '603, information that is not required for control operations is included, causing the amount of data that is collected to be too large, complicating the handling thereof, which is inconvenient. Consequently, it is desirable in an effective information collecting function that is specialized for control operations to have an improved function that is not too complex and wherein the information deficiency is not too great. In particular, there is the need for improvements for broader use in specialty situations, rather than just for handling ramping of temperatures up and down.

An alarm function, for example, for when an open circuit is detected in a sensor, is included in a temperature controller, which is a representative example of a simple PID controller. The time band before and after an alarm event is a time band that is subject to analysis of the cause for the alarm, and thus particularly detailed time series data are required. However, there is a problem in that no function for collecting detailed time series data for the time band before and after an alarm event has been achieved in the conventional PID controller.

The present invention was created in order to solve the problem set forth above, and an aspect thereof is to provide a PID controller, and data collecting method, able to collect detailed time series data before and after an alarm event, assuming that it will be incorporated into low-cost production such as with a simple PID controller, such as a temperature controller.

SUMMARY

A PID controller according to the present invention includes: a manipulated variable calculating portion that calculates a manipulated variable MV based on a set point SP and a process variable PV through a PID control calculation; a manipulated variable outputting portion that outputs, to a subject of control, the manipulated variable MV calculated by the manipulated variable calculating portion; a data recording portion that records temporarily time series data for the process variable PV; an alarm notifying portion that generates an alarm when a problem has been detected; and a data storing portion that reads out from the data recording portion, and stores, data recorded by the data recording portion before and after the occurrence of the alarm.

Moreover, in one structural example of a PID controller according to the present invention: the data storing portion stores data in a range from a time that is a first time interval T1 prior to the time at which an alarm has occurred until a time that is a second time interval T2 after the time at which the alarm occurred; and the first time interval T1 and the second time interval T2 are set in advance to a value that is α times the integrating time interval TI in the PID parameters.

Moreover, in one structural example of a PID controller according to the present invention: the subject of control is a heating controlling system wherein a heater is used; the data storing portion stores data in a range from a time that is a first time interval T1 prior to the time at which an alarm has occurred until a time that is a second time interval T2 after the time at which the alarm occurred; and the first time interval T1 and the second time interval T2 are set to different time intervals depending on the type of alarm.

Moreover, in one structural example of a PID controller according to the present invention: the data storing portion uses the value of α times the integrating time interval TI of the PID parameters for the first time interval T1 and the second time interval T2 in the event of an alarm for an open circuit in the heater, and a constant value that is not related to the PID parameters is used for the first time interval T1 and the second time interval T2 in the event of an alarm for an open circuit for a sensor.

Moreover, in one structural example of a PID controller according to the present invention: the alarm notifying portion generates an alarm when the process variable PV is outside of a prescribed process variable range, or if the rate of change per unit time of the process variable PV is outside of a prescribed range for the rate of change of the process variable.

Moreover, one structural example of a PID controller according to the present invention further includes: a reading directing portion that directs the operator to use a higher-level device to read in data that has been stored by the data storing portion when the data that has been stored by the data storing portion arrives at an amount of data commensurate with at least a prescribed amount of time.

Moreover, in one structural example of a PID controller according to the present invention: the data recording portion records temporarily time series data for the manipulated variable MV and time series data for the set point SP; and the data storing portion reads out from the data recording portion, and stores, time series data for the manipulated variable MV and time series data for the set point SP recorded by the data recording portion before and after the occurrence of the alarm, in addition to the time series data for the process variable PV.

A data collecting method according to the present invention includes: a manipulated variable calculating step for calculating a manipulated variable MV based on a set point SP and a process variable PV through a PID control calculation; a manipulated variable outputting step for outputting, to a subject of control, the manipulated variable MV calculated in the manipulated variable calculating step; a data recording step for recording temporarily time series data for the process variable PV; an alarm notifying step for generating an alarm when a problem has been detected; and a data storing step for reading out and storing data recorded in the data recording step before and after the occurrence of the alarm.

Given the present invention, data that is recorded temporarily by the data recording portion before and after an alarm event are read out from the data recording portion and stored only when there is an alarm event, and thus it is possible to collect data for analysis of the cause of the alarm without becoming too complex and without there being too great an insufficiency of information. In the present invention, it is possible to collect, as a record for symptom analysis, data indicating an increase in measurement noise prior to a sensor open circuit alarm event, data indicating an equilibrium point problem prior to a heater open circuit alarm event, and the like. Moreover, in the present invention the data is collected within the PID controller, making it possible to eliminate reliably situations wherein data is lost through communication noise, and the like, when compared to a case wherein the data is collected by a data collecting instrument that is outside of the PID controller, through a communication network, or the like.

Moreover, the present invention enables a reduction in the overhead on the operator through carrying out PID controller set-up operations through setting in advance a first time interval T1 and a second time interval T2, which determine the time bands before and after an alarm event to values that are α times the integrating time interval TI in the PID parameters.

Moreover, the present invention makes it possible to set the first time interval T1 and the second time interval T2, which determine the time band before and after the alarm event, appropriately depending on the type of alarm, through setting to times that vary depending on the type of alarm.

Moreover, in the present invention it is possible to communicate to the operator that the open capacity for storing data in the data string portion is becoming small, through providing notification to the operator, such as through the data stored by the data storing portion being read out by a higher-level device, when the data stored by the data storing portion has arrived at data in excess of an amount commensurate with a specific period of time.

BRIEF DESCRIPTIONS OF THE DRAWINGS

DETAILED DESCRIPTION

In a PID controller, such as a temperature controller, in a time band before and after an alarm event, detailed time series data are necessary in order to analyze the cause of the alarm. On the other hand, in the case of PID calculations, the nature of the control operation during normal times, wherein there is no alarm event, generally can be reproduced easily through simulations, or the like. That is, even if it is not possible to obtain detailed time series data, this causes no great impediment to analysis after the fact, except for in a time band before and after an alarm event.

Based on the discovery of the problem set forth above, the present inventor focused on the fact that generally the interval for an alarm event is short in terms of time, arriving at the concept of using before and after an alarm event in order to expand the use in specialty states. The range for the time band before and after an alarm event can be determined based on the PID parameters.

Specifically, collection and temporary recording of data is carried out constantly, and then the data that has been collected and recorded before and after the alarm event is stored in a write-protected state, only when there is an alarm event. Doing this makes it possible to collect the data for analyzing the cause of the alarm without becoming overly complex and without the information deficiency being too great.

Note that while the use of a data collecting function within a simple PID controller, such as a temperature controller, makes it possible to reliably capture the "data for producing a control system" that is effective in analyzing the cause of an alarm, the storage capacity of the PID controller is limited. Consequently, preferably there is both a function for notifying an operator so as to read in data through a higher-level device (for example, a PC (personal computer)) that is able to secure adequate storage capacity, and a function that transfers data to the higher-level device automatically to return the data region of the PID controller into a state wherein overwriting is allowed.

Figure 1:
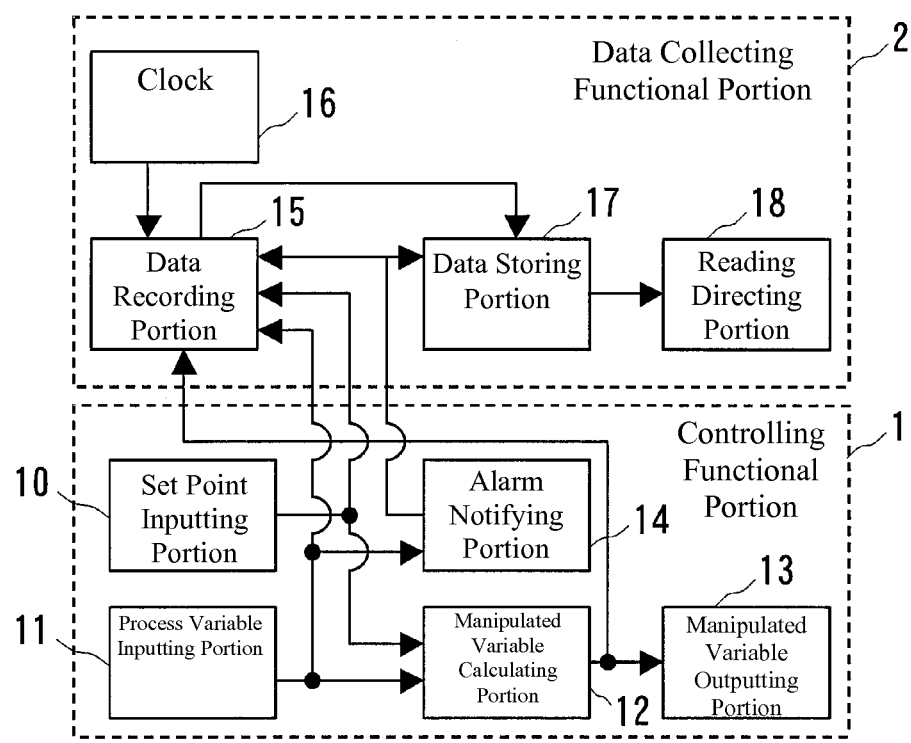
FIG. 1 is a block diagram illustrating a structure for a PID controller according to an example according to the present disclosure.

Forms for carrying out the present disclosure will be explained below in reference to the figures. FIG. 1 is a block diagram illustrating a structure for a PID controller according to an example according to the present disclosure. The PID controller includes a controlling functional portion 1, which is a typical structure that is conventionally provided in a PID controller, and a data collecting functional portion 2, which is a distinctive structure in the present example.

The controlling functional portion 1 is provided with: a set point inputting portion 10 for inputting a set point SP from outside of the controller; a process variable inputting portion 11 for inputting a process variable PV from a measurement instrument; a manipulated variable calculating portion 12 for calculating a manipulated variable MV based on the set point SP and the process variable PV through PID control calculations; a manipulated variable outputting portion 13 for outputting the manipulated variable MV to outside of the controller; and an alarm notifying portion 14 for generating an alarm when a fault has been detected.

The data collecting functional portion 2 is provided with: a data recording portion 15 for recording temporarily time series data for the process variable PV, time series data for the manipulated variable MV, and time series data for the set point SP; a clock 16 for measuring the current date and time; a data storing portion 17 for reading out, and saving, the data recorded by the data recording portion 15 before and after an alarm event; and a reading directing portion 18 for instructing the operator to read in, through the higher-level device, data that is stored by the data storing portion 17, when the data that is stored in the data storing portion 17 arrives at data of an amount that is greater than that for a prescribed amount of time.

Figure 2:
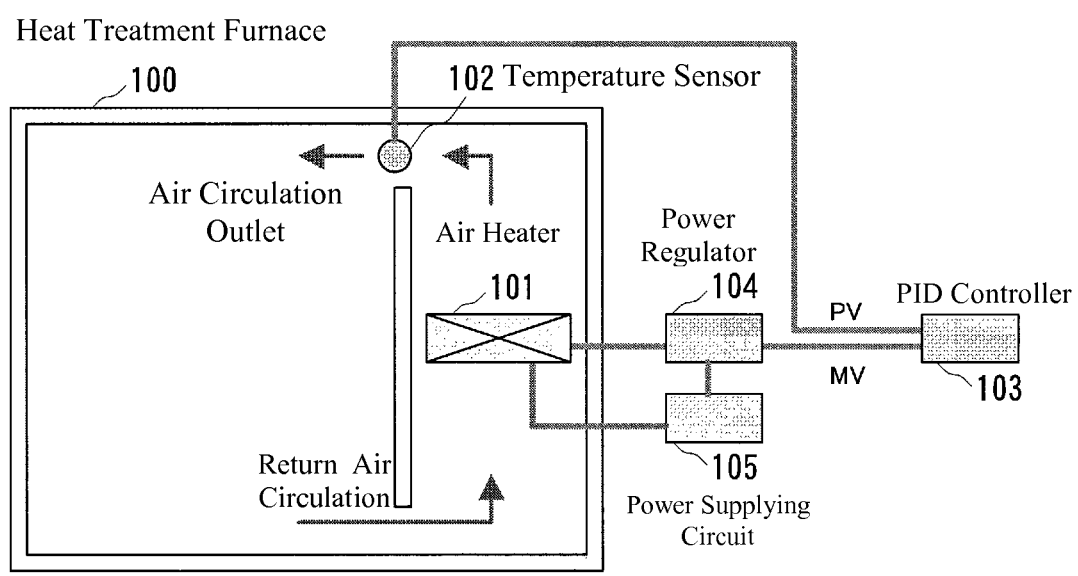
FIG. 2 is a block diagram illustrating a configuration for a heating device according to an example according to the present disclosure.

FIG. 2 is a block diagram illustrating one configuration of a heating controlling device to which the present example is applied. The heating controlling device is structured from a heat treatment furnace 100 for heating a heating object that is subject to treatment; an electric heater 101; a temperature sensor 102 for measuring the temperature within the heat treatment furnace 100; a PID controller 103 for controlling the temperature within the heat treatment furnace 100; a power regulator 104; and a power supplying circuit 105.

The PID controller 103 calculates a manipulated variable MV so that a process variable PV (the temperature) that is measured by a temperature sensor 102 will go to a set point SP. The set point SP is set by an operator, for example. The power regulator 104 determines the electric power in accordance with the manipulated variable MV, and supplies, to an electric heater 101 through the power supplying circuit 105, the power that has been determined. In this way, the PID controller 103 controls the temperature of the object that is heated within the heat treatment furnace 100. The controlling functional portion 1 and the data collecting functional portion 2 of FIG. 1 are built into the PID controller 103.

The operation of the present example will be explained next in reference to FIG. 3. The set point SP is set by an operator, or the like, and is inputted into the manipulated variable calculating portion 12 and a data recording portion 15 through the set point inputting portion 10 (FIG. 3, Step S1).

Figure 3:
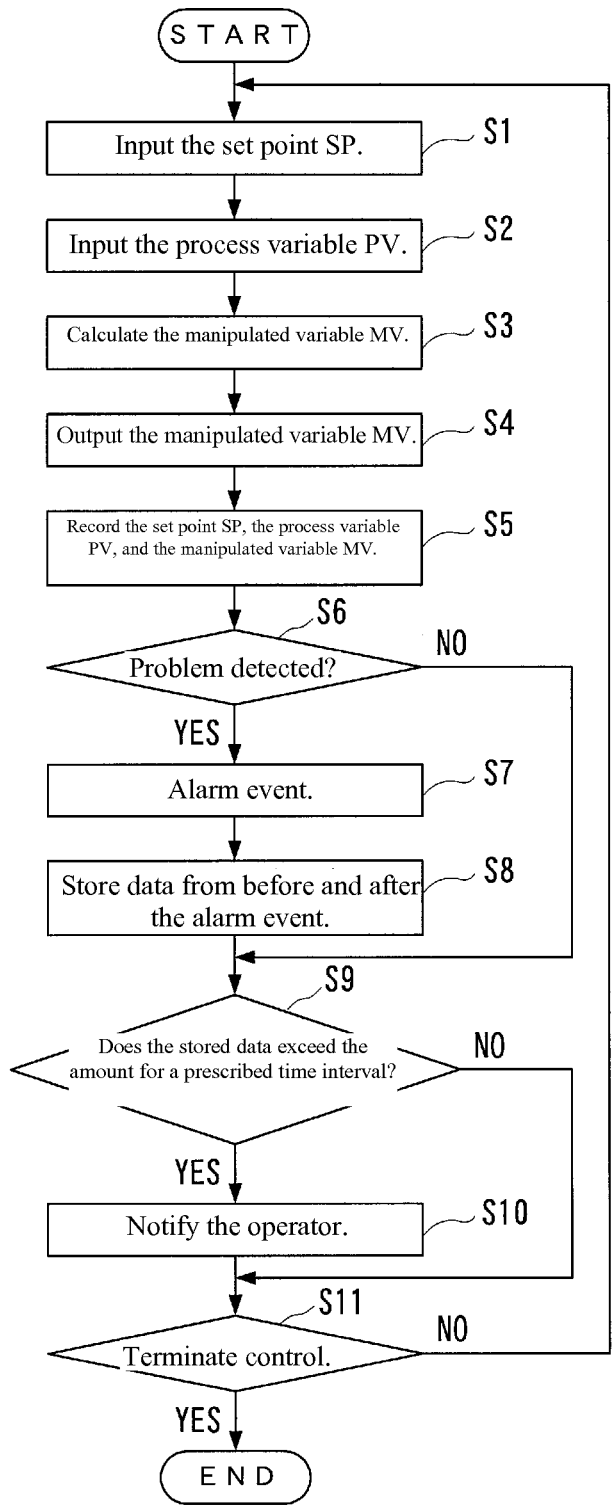
FIG. 3 is a flow chart illustrating the operation of a PID controller according to an example according to the present disclosure.

The process variable PV is measured by a measuring instrument (for example, the temperature sensor 102 in FIG. 2), and is inputted through the process variable inputting portion 11 into the manipulated variable calculating portion 12, the alarm notifying portion 14, and the data recording portion 15 (Step S2 in FIG. 3).

The manipulated variable calculating portion 12 calculates a manipulated variable MV based on a set point SP and a process variable PV through the PID control calculation such as through the following transfer function equation (Step S3 in FIG. 3):

$$MV=(100/PB)\{1+(1/TIs)+TDs\}(SP-PV) \quad (1)$$

In Equation (1), PB is a proportional band, TI is an integrating time, TD is a differentiating time, and s is the Laplace operator.

The manipulated variable outputting portion 13 outputs, to the controlled subject, the manipulated variable MV that has been calculated by the manipulated variable calculating portion 12 (FIG. 3, Step S4). In the example shown in FIG. 2, an electric power adjusting instrument 104 is the actual output destination for the manipulated variable MV.

The data recording portion 15 records temporarily, as data that is to be collected, the process variable PV that is inputted from the process variable inputting portion 11, the manipulated variable MV that is calculated by the manipulated variable calculating portion 12, and the set point SP that is inputted from the set point inputting portion 10 (FIG. 3, Step S5). At this time, the data recording portion 15 records the current time information, obtained from the clock 16, in addition to the data set including the process variable PV, the manipulated variable MV, and the set point SP.

When the control operation continues and the procedures in Step S1 through S5 are repeated with each control interval, time series data for the process variable PV, time series data for the manipulated variable MV, and time series data for the set point SP are stored in the data recording portion 15.

Following this, when the alarm notifying portion 14 has detected a problem (YES in Step S6 in FIG. 3), an alarm event is produced (Step S7 in FIG. 3). Types of problems include, for example, problems with control operations, such as the process variable PV being outside of a prescribed process variable range, the rate of change per unit time of the process variable PV being outside of a prescribed range for the rate of change of the process variable, or the like, faults in the PID controller itself, or problems with the setup such as in the parameters that are set in the PID controller (the PID parameters, or the like). Methods for generating and providing notification of alarm events include, for example, outputting an alarm signal to the higher-level device (for example, a PC (personal computer)), or flashing or illuminating an alarm notification LED that is provided on the PID controller, or the like.

When there is an alarm event, the data storing portion 17 reads out, from the data recording portion 15, and then stores, the data that is recorded in the data recording portion 15 before and after the alarm event (said data including the time series data for the process variable PV, the time series data for the manipulated variable MV, and the time series data for the set point SP) (Step S8 in FIG. 3). "Before and after an alarm event" refers to the range from a time that is a prescribed first time interval T1 prior to the time at which the alarm was produced up until a time that is a prescribed second time interval T2 after the time at which the alarm was produced. Consequently, this range includes also the time at which the alarm was produced.

The data storing portion 17, based on the time information that is added to the data recorded by the data recording portion 15, may read out, from the data recording portion 15, data starting at the time that is a prescribed first time interval T1 prior to the time at which the alarm was produced up until the time at which the alarm was produced, may store, in the sequence in which they were recorded in the data recording portion 15 (the sequence of the times indicated by the time information), the data that has been read out, and may further sequentially read out from the data recording portion 15, and sequentially store in the sequence in which they were recorded in the data recording portion 15, those data that were recorded in the data recording portion 15 after the time of the alarm event that are data up until the time that is the prescribed second time interval T2 after the time of the alarm event. The first time interval T1 and the second time interval T2 may or may not be identical.

Note that while in the method for storing data here the storing of data continues from the time of the alarm event up until the second time interval T2 elapses, there is no limitation thereto, but instead the storing of data may be completed all once. Specifically, when an alarm has occurred, the data storing portion 17 may read out from the data recording portion 15, and store, data in the range from the time that is the first time interval T1 prior to the time of the alarm event up until the time that is the second time interval T2 from the time of the alarm event after the second time interval T2 has elapsed after the alarm event, rather than carrying out the procedure in Step S8 immediately.

The difference between the temporary recording of data by the data recording portion 15 and the storage of data by the data storing portion 17, as is to be appreciated from the explanation above, is in the point that, in contrast to recording of all data by the data recording portion 15 without distinguishing whether or not there is an alarm event, only data from before and after the alarm event is stored in the data storing portion 17, and in the point that overwriting of data is allowed in the data recording portion 15, where, in contrast to sequentially overwriting the old data with new data when the upper limit of the storage capacity has been reached in the data recording portion 15, overwriting of data is prohibited in the data storing portion 17, and insofar as data that has been stored is not deleted, it will not be possible to store new data. The storage capacities for the data recording portion 15 and the data storing portion 17 should be at least capacities that are larger than the amount of data in the range for before and after the alarm event.

When the data stored in the data storing portion 17 has reached an amount of data that is at least equal to the amount of data for a prescribed amount of time (Step S9 in FIG. 3), the reading directing portion 18 prompts the operator to read out, using a higher-level device (for example, a PC) the data that is stored in the data storing portion 17 (Step S10 in FIG. 3). The prompting method may be a method such as, for example, a blinking or illuminated LED that enables the operator to identify the prompt.

The processes in Step S1 through S10 as described above are repeated at each control interval until the control is terminated through, for example, an instruction from an operator (YES in Step S11 in FIG. 3).

Note that when there is an alarm event, the alarm event continues until the cause of the alarm has been eliminated, it is not necessary to repeat the procedure in Step S8 of FIG. 3 for an alarm of an identical type, but rather the data storing portion 17 may store data before and after the alarm just the first time that the alarm occurs.

The type of alarm (a problem with the process variable PV, a problem with the rate of change of the process variable PV, a PID controller fault, a problem with a parameter setting, or the like) can be identified through an alarm code that is added to the alarm signal that is outputted from the alarm notifying portion 14. When data from before and after an alarm event is stored, the data storing portion 17 stores the data after adding the alarm code acquired from the alarm notifying portion 14. Doing so enables the data storing portion 17 to identify the type of alarm for which the data for before and after the alarm event is being stored. The data storing portion 17 limits to a single time the number of times that the data for before and after the alarm event is stored for a single type of alarm, and then, if data has been stored already for before and after an alarm event for the same type of alarm, does not carry out the same procedures again redundantly.

Figure 4:
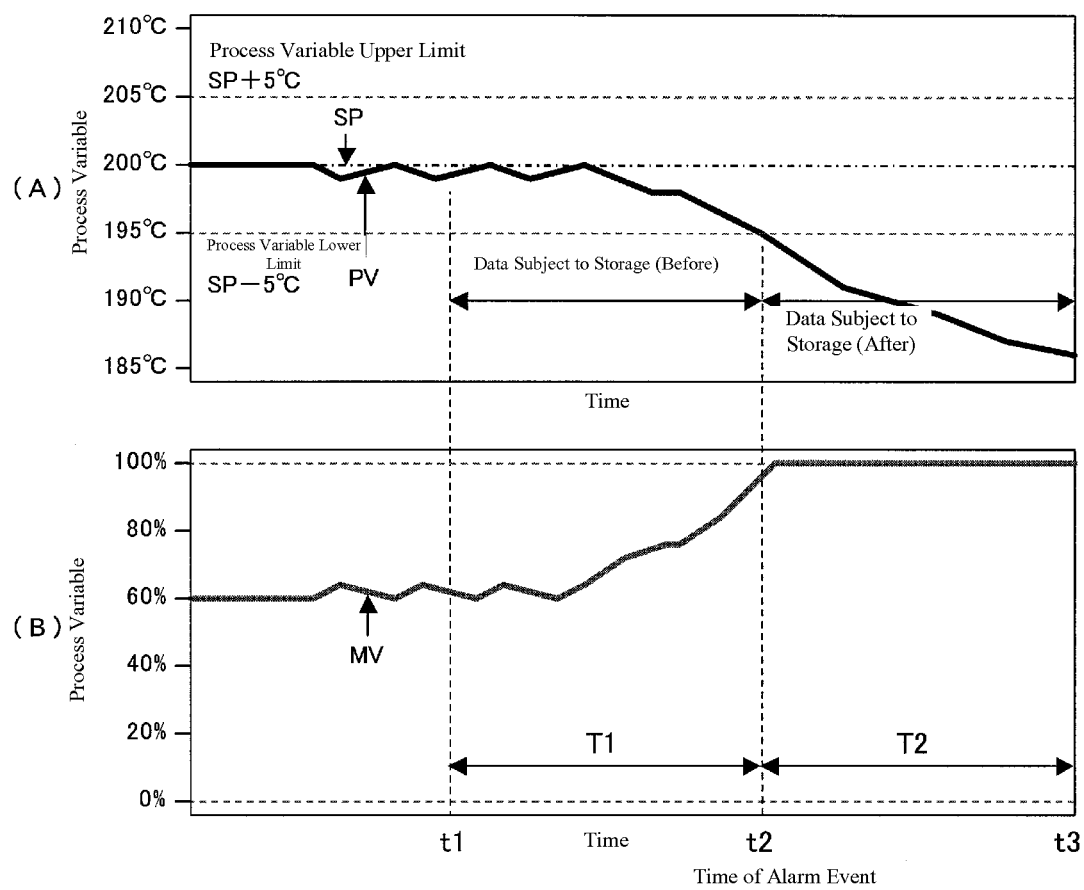
FIG. 4 is a diagram for explaining the data collecting operation of the PID controller according to an example according to the present disclosure.

FIG. 4(A) and FIG. 4(B) are diagrams for explaining the operations in collecting data with a PID controller according to the present example, where FIG. 4(A) illustrates one example of variation in the process variable PV, and FIG. 4(B) illustrates one example of variation in the manipulated variable MV. The vertical axis in FIG. 4(A) is the process variable PV, and the horizontal axis is time, where the vertical axis in FIG. 4(B) is the manipulated variable MV, and the horizontal axis is time. Here the explanation will assume that the set point SP is a temperature set point, and the process variable PV is a temperature measurement, in a case such as, for example, collecting data in the heat treatment furnace in FIG. 2. Moreover, (SP−5° C.) through (SP+5° C.) is the normal range of the process variable. Consequently, an alarm is produced if the process variable PV falls below (SP−5° C.) or above (SP+5° C.).

In the example in FIG. 4(A) and FIG. 4(B), an alarm is produced when, in temperature control with the set point SP=200° C., there is variability that normally does not appear in the manipulated variable MV, and the process variable PV goes down and eventually falls below the lower limit value (SP−5° C.) for the range of the process variable at time t2. The data storing portion 17 stores, by reading out from the data recording portion 15, data from the time t1, which is the first time interval T1 prior to the time t2 of the alarm event, up until a time t3, which is after the second time interval T2 after the time t2 of the alarm event.

In a PID controller, such as a temperature controller, when there is a rapid change in the measured value for the temperature (the process variable PV) due to, for example, an open circuit in a sensor (that is, when the rate of change of the process variable PV exceeds a prescribed rate of change for the process variable), or when there is a problematic decrease in the measured value for the temperature (the process variable PV) due to an open circuit in the heater accompanying, for example, a rapid change in the manipulated variable MV when there is a change in the set point SP (where the process variable PV goes outside of a prescribed range for the process variable), or the like, it is then necessary to store the data as described above.

In the present example it is possible to collect, as a record for symptom analysis, data that indicates an increase in the measurement noise prior to the sensor open circuit alarm event, data that indicates a problem with the equilibrium point prior to the heater open circuit alarm event, or the like. Moreover, in the present example the data is collected within the PID controller, making it possible to eliminate reliably situations wherein data is lost through communication noise, and the like, when compared to a case wherein the data is collected by a data collecting instrument that is outside of the PID controller, through a communication network, or the like.

When there is high-frequency noise that is higher than the frequency characteristics of the control operation of (which, given the nature of PID calculations, can be calculated), there is a tendency for there to be problematic control operations that lead to alarm events. Consequently, setting the first time interval T1 and the second time interval T2 to be, for example, α times the integrating time interval TI for the PID parameter (with, for example, α equals 2.0) (T1=T2=αTI) enables the operator to make the appropriate setting without excessive effort.

Insofar as the alarm is one wherein a problematic value appears in the process variable PV through, for example, an open circuit in a sensor, then the problem is in the measurement system alone, and, in principle, it is not related to the time constant for that which is being control nor to waste time. On the other hand, if the alarm is one wherein a problematic value appears in the process variable PV through an open circuit in the heater, then the problem is one with the control operation system, and the longer the time constant or the waste time of that which is being controlled, the longer the time until the alarm event is produced immediately following the open circuit in the heater. Typically, when the time constant or the waste time for that which is being controlled is long, the integrating time interval TI for the PID parameter is set to a large value.

Consequently, for an open circuit alarm in a heater (when the process variable PV goes outside of a prescribed process variable range), the data storing portion 17 should use a value of α times the integrating time interval TI, as described above, for the first time interval T1 and the second time interval T2 (T1=T2=αTI), as described above, and for an alarm for an open circuit in a sensor (wherein the rate of change of the process variable PV goes outside of a prescribed range for the rate of change of the process variable), it should use a constant value β, which is not related to the PID parameters, for the first time interval T1 and the second time interval T2 (T1=T2=β). As described above, it is possible to distinguish the type of alarm through the alarm code that is added to the alarm signal that is outputted from the alarm notifying portion 14. The storage capacities of the data recording portion 15 and of the data storing portion 17 should be capacities that are larger than the amount of data for the maximum value for the amount of time of the time intervals (T1+T2) for the first time interval T1 and the second time interval T2 if they differ depending on the type of alarm.

The example set forth above makes it possible to collect data for analyzing the cause of an alarm without becoming overly complex and without an excessive information deficiency.

Note that while in the present example the presence of a clock function (a function that adds time information to the data) was present within the PID controller, there is no limitation thereto. Because the data recording portion 15 records data with each control interval, the intervals between the individual data are equal to the control interval. Consequently, the number of data included within a range of time of a desired length can be calculated easily. That is, in a case wherein there is no clock function within the PID controller, when there is an alarm event the data storing portion 17 may read out, from the data recording portion 15, the data from the past, recorded in the data recording portion 15 prior to the time of the alarm event, going backwards in an amount equivalent to the first time interval T1, sequentially from the earliest data, to store this data that has been read out in the sequence in which it was recorded in the data recording portion 15, and then may read out and store, from the data recording portion 15, that data of an amount corresponding to the second time interval T2 from the data recorded in the data recording portion 15 after the time of the alarm event.

Moreover, while in the present example a reading directing portion 18 is provided in the data collecting functional portion 2, an automatic transferring portion may be provided instead. These automatic transferring portion automatically transfer to the higher-level device, through a communication network, data that is stored in the data storing portion 17, and delete the data that is stored in the data storing portion 17, when the data that is stored in the data storing portion 17 arrives at data of an amount that is greater than that for a prescribed amount of time. Doing so makes it possible to return the data storing portion 17 to a state wherein the data can be overwritten.

Moreover, in the present example the data recording portion 15 stores time series data for the process variable PV, time series data for the manipulated variable MV, and time series data for the set point SP, and the data storing portion 17 stores data that is recorded by the data recording portion 15 before and after an alarm event; however, the recording/storing of the time series data for the manipulated variable MV and for the time series data for the set point SP is not an essential condition for the present invention. The data recording portion 15 instead may just record the time series data for the process variable PV, and the data storing portion 17 may just store the time series data for the process variable PV that is recorded by the data recording portion 15 before and after the alarm event.

The PID controller described in the present example can be embodied through a computer that is provided with a CPU (Central Processing Unit), a memory device, and an interface, and a program for controlling these hardware resources. The CPU executes the processes described in the present example in accordance with a program that is stored in the storage device.

The present invention can be applied to PID controllers that are provided with data collection functions.

The invention claimed is:

1. A PID controller, comprising:
processing circuitry configured to
calculate a manipulated variable based on a set point and a process variable through a PID control calculation;
output, to a subject of control, the calculated manipulated variable;
record, to a memory, temporarily, time series data for the process variable;
generate an alarm when a problem has been detected; and
read out, from the memory, and store, data recorded in the memory before and after occurrence of the alarm, wherein the processing circuitry is further configured to store data in a range from a time that is a first time interval prior to a time at which the alarm has occurred until a time that is a second time interval after the time at which the alarm occurred; and
the first time interval and the second time interval are set in advance to a value that is α times an integrating time interval in PID parameters.

2. The PID controller as set forth in claim 1, wherein:
the processing circuitry is further configured to generate the alarm when the process variable is outside of a prescribed process variable range, or when a rate of change per unit time of the process variable is outside of a prescribed range for the rate of change per unit time of the process variable.

3. A PID controller, comprising:
processing circuitry configured to
calculate a manipulated variable based on a set point and a process variable through a PID control calculation;
output, to a subject of control, the calculated manipulated variable;
record, to a memory, temporarily, time series data for the process variable;

generate an alarm when a problem has been detected; and read out, from the memory, and store, data recorded in the memory before and after occurrence of the alarm, wherein:

the subject of control is a heating controlling system wherein a heater is used;

the processing circuitry is further configured to store data in a range from a time that is a first time interval prior to a time at which an alarm has occurred until a time that is a second time interval after the time at which the alarm occurred; and the first time interval and the second time interval are set to different time intervals depending on a type of the alarm.

4. The PID controller as set forth in claim 3, wherein:

the processing circuitry is further configured to use a value of $\alpha$ times an integrating time interval of PID parameters for the first time interval and the second time interval in an event of an alarm for an open circuit in the heater, and a constant value that is not related to PID parameters is used for the first time interval and the second time interval in the event of an alarm for an open circuit for a sensor.

5. A PID controller, comprising:

processing circuitry configured to calculate a manipulated variable based on a set point and a process variable through a PID control calculation;

output, to a subject of control, the calculated manipulated variable;

record, to a memory, temporarily, time series data for the process variable;

generate an alarm when a problem has been detected; and read out, from the memory, and store, data recorded in the memory before and after occurrence of the alarm, wherein:

the processing circuitry is further configured to record, temporarily, time series data for the manipulated variable and time series data for the set point; and read out, from the memory, and store, time series data for the manipulated variable and time series data for the set point recorded by the memory before and after the occurrence of the alarm, in addition to the time series data for the process variable.

6. A data collecting method, comprising:

calculating a manipulated variable based on a set point and a process variable through a PID control calculation;

outputting, to a subject of control, the calculated manipulated variable;

recording, to a memory, temporarily, time series data for the process variable;

generating an alarm when a problem has been detected; and reading out and storing data recorded in the recording step before and after occurrence of the alarm, wherein the reading out and storing step comprises storing data in a range from a time that is a first time interval prior to a time at which the alarm has occurred until a time that is a second time interval after the time at which the alarm occurred; and the first time interval and the second time interval are set in advance to a value that is $\alpha$ times an integrating time interval in PID parameters.

7. The data collecting method as set forth in claim 6, wherein:

the generating step includes generating an alarm when the process variable is outside of a prescribed process variable range, or when a rate of change per unit time of the process variable is outside of a prescribed range for the rate of change per unit time of the process variable.

8. A data collecting method, comprising:

calculating a manipulated variable based on a set point and a process variable through a PID control calculation;

outputting, to a subject of control, the calculated manipulated variable;

recording, to a memory, temporarily, time series data for the process variable;

generating an alarm when a problem has been detected; and reading out and storing data recorded in the recording step before and after occurrence of the alarm, wherein:

the subject of control is a heating controlling system wherein a heater is used;

the reading out and storing step comprises storing data in a range from a time that is a first time interval prior to a time at which an alarm has occurred until a time that is a second time interval after the time at which the alarm occurred; and the first time interval and the second time interval are set to different time intervals depending on a type of the alarm.

9. The data collecting method as set forth in claim 8, wherein:

the reading out and storing step uses a value of $\alpha$ times an integrating time interval of PID parameters for the first time interval and the second time interval in an event of an alarm for an open circuit in the heater, and a constant value that is not related to PID parameters is used for the first time interval and the second time interval in the event of an alarm for an open circuit for a sensor.

10. A data collecting method, comprising:

calculating a manipulated variable based on a set point and a process variable through a PID control calculation;

outputting, to a subject of control, the calculated manipulated variable;

recording, to a memory, temporarily, time series data for the process variable;

generating an alarm when a problem has been detected; and reading out and storing data recorded in the recording step before and after occurrence of the alarm, wherein:

the recording step includes a step of recording, temporarily time series data for the manipulated variable and time series data for the set point; and the reading out and storing step includes reading out and storing, time series data for the manipulated variable and time series data for the set point recorded in the recording step before and after the occurrence of the alarm.

* * * * *